(12) United States Patent
Liu et al.

(10) Patent No.: US 12,101,724 B2
(45) Date of Patent: Sep. 24, 2024

(54) METHODS AND APPARATUSES OF POWER CONTROL FOR ADDITIONAL SRS

(71) Applicant: LENOVO (BEIJING) LIMITED, Beijing (CN)

(72) Inventors: Bingchao Liu, Beijing (CN); Chenxi Zhu, Beijing (CN); Haipeng Lei, Beijing (CN); Wei Ling, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 212 days.

(21) Appl. No.: 17/628,325

(22) PCT Filed: Jul. 19, 2019

(86) PCT No.: PCT/CN2019/096783
§ 371 (c)(1),
(2) Date: Jan. 19, 2022

(87) PCT Pub. No.: WO2021/012091
PCT Pub. Date: Jan. 28, 2021

(65) Prior Publication Data
US 2023/0087272 A1  Mar. 23, 2023

(51) Int. Cl.
| | |
|---|---|
| *H04W 52/24* | (2009.01) |
| *H04W 52/14* | (2009.01) |
| *H04W 52/16* | (2009.01) |
| *H04W 52/32* | (2009.01) |
| *H04W 52/58* | (2009.01) |
| *H04W 52/08* | (2009.01) |

(52) U.S. Cl.
CPC ....... *H04W 52/248* (2013.01); *H04W 52/146* (2013.01); *H04W 52/16* (2013.01); *H04W 52/325* (2013.01); *H04W 52/58* (2013.01); *H04W 52/08* (2013.01)

(58) Field of Classification Search
CPC ......... H04W 52/00–60; H04W 52/248; H04W 52/146; H04W 52/16; H04W 52/325; H04W 52/58; H04W 52/08
See application file for complete search history.

(56) References Cited

U.S. PATENT DOCUMENTS

| | | | |
|---|---|---|---|
| 2014/0036809 A1 | 2/2014 | Xu et al. | |
| 2016/0014125 A1* | 1/2016 | Klein | H04L 61/59 |
| | | | 709/224 |
| 2018/0324716 A1* | 11/2018 | Jeon | H04W 74/0833 |

(Continued)

FOREIGN PATENT DOCUMENTS

| | | |
|---|---|---|
| CN | 102291812 A | 12/2011 |
| CN | 103828274 A | 5/2014 |

(Continued)

OTHER PUBLICATIONS

3GPP TSG RAN WG1 Meeting#97, May 13-17, 2019 (Year: 2019).*

(Continued)

*Primary Examiner* — Raymond S Dean
(74) *Attorney, Agent, or Firm* — Kunzler Bean & Adamson (57) ABSTRACT

Methods and apparatuses of power control for additional SRS are disclosed. A method at abase unit comprises transmitting power control parameters for transmitting additional SRS by higher layers; and transmitting TPC command by DCI format 3B for additional SRS.

18 Claims, 9 Drawing Sheets

(56) References Cited

U.S. PATENT DOCUMENTS

2019/0044681 A1    2/2019   Zhang
2019/0075014 A1*  3/2019   Zhou .................. H04W 74/0833
2019/0253986 A1*  8/2019   Jeon ...................... H04L 5/0048

FOREIGN PATENT DOCUMENTS

| CN | 106912094 A | 6/2017 |
| --- | --- | --- |
| CN | 108029118 A | 5/2018 |
| CN | 1088886457 A | 11/2018 |

OTHER PUBLICATIONS

3GPP TS 36.213 V15.6.0, Jun. 2019 (Year: 2019).*
Huawei, Hisilicon, Discussion on power control for additional SRS, 3GPP TSG RAN WG1 Meeting #97, R1-1906068, May 13-17, 2019, pp. 1-3, Reno, USA.
3 Generation Partnership Project, Technical Specification Group Radio Access Network; Evolved Universal Terrestrial Radio Access (E-UTRA); Physical layer procedures, 3GPP TS 36.213 V15.6.0 (Jun. 2019), Jun. 24, 2019, pp. 1-51.
International Searching Authority, "Written Opinion of the International Searching Authority," PCT/CN2019/096783, Apr. 14, 2020, pp. 1-3.

* cited by examiner

METHODS AND APPARATUSES OF POWER CONTROL FOR ADDITIONAL SRS

FIELD

The subject matter disclosed herein generally relates to wireless communications and, more particularly, to methods and apparatuses of power control for additional SRS.

BACKGROUND

The following abbreviations are herewith defined, some of which are referred to within the following description: Third Generation Partnership Project (3GPP), Frequency Division Duplex (FDD), Long Term Evolution (LTE), New Radio (NR), Very Large Scale Integration (VLSI), Random Access Memory (RAM), Read-Only Memory (ROM), Erasable Programmable Read-Only Memory (EPROM or Flash Memory), Compact Disc Read-Only Memory (CD-ROM), Local Area Network (LAN), Wide Area Network (WAN), User Equipment (UE), Uplink (UL), Evolved Node B (eNB), Next Generation Node B (gNB), Downlink (DL), Central Processing Unit (CPU), Graphics Processing Unit (GPU), Field Programmable Gate Array (FPGA), Dynamic RAM (DRAM), Physical Uplink Shared Channel (PUSCH), Physical Uplink Control Channel (PUCCH), Physical Downlink Control Channel (PDCCH), Sounding Reference Signal (SRS), SRS Resource Indicator (SRI), Downlink Control Information (DCI), Resource Block (RB), Time Division Duplex (TDD), Radio Resource Control (RRC), Media Access Control (MAC), Transmission Power Control (TPC), Transmission Time Interval (TTI).

SRS is transmitted on the uplink channel to allow the base station to estimate the state of the uplink channel. SRS transmission can also be used for uplink timing estimation as well as estimating downlink channel conditions assuming downlink and uplink channel reciprocity.

At present, enhancement to SRS capacity and coverage has been approved in LTE Release 16. More than one symbol in a normal subframe can be used for SRS transmission in LTE Release 16. The SRS transmitted at symbols other than the last symbol in a normal subframe is referred to as additional SRS. Aperiodic SRS transmission for additional SRS symbol(s) can be configured in any symbols other than the last symbol in the normal subframe. SRS transmitted at the last symbol in a normal subframe is referred to as a legacy SRS.

Additional SRS and legacy SRS can be transmitted in the same subframe with or without PUSCH/PUCCH. Hereinafter, PUSCH/PUCCH means PUSCH and/or PUCCH. One potential issue is how to determine the transmit power for the SRS transmission for different scenarios.

BRIEF SUMMARY

It is an object of the present application to propose several methods to determine the transmit power for SRS transmission for different scenarios. In particular, methods and apparatuses of power control for additional SRS are disclosed.

In one embodiment, a method at a base unit comprises transmitting power control parameters for transmitting additional SRS by higher layers; and transmitting TPC command by DCI format 3B for additional SRS.

In some embodiment, the DCI format 3B is scrambled by a dedicated scrambling ID configured by higher layers.

In some embodiment, additional field is added to DCI format 3B for the TPC command for additional SRS, and the start bit of the additional field is configured by higher layers.

In some embodiment, the power control parameters include power offset between PUSCH and the additional SRS.

In another embodiment, a method at a remote unit, comprises receiving power control parameters for transmitting additional SRS by higher layers; and receiving TPC command carried by DCI format 3B.

In some embodiment, transmit power for additional SRS is determined according to $P_{SRS,c}(i)=P_{additional\_SRS,c}(i)$ when the additional SRS is transmitted in a normal subframe without PUSCH/PUCCH or legacy SRS, or when the additional SRS and the legacy SRS are transmitted in the same subframe without PUSCH/PUCCH, or when the additional SRS and legacy SRS are transmitted in the same subframe and a one symbol guard period is configured between the additional SRS and the legacy SRS.

In some embodiment, the same transmit power for the additional SRS and legacy SRS is determined according to $P_{SRS,c}(i)=\min\{P_{additional\_SRS,c}(i), P_{Legacy\_SRS,c}(i)\}$ when the additional SRS and the legacy SRS are transmitted in the same subframe.

In yet another embodiment, a base unit comprises a transmitter, the transmitter is configured to: transmit power control parameters for transmitting additional SRS by higher layers; and transmit TPC command by DCI format 3B for additional SRS.

In further embodiment, a remote unit comprises a receiver, the receiver is configured to: receive power control parameters for transmitting additional SRS by higher layers; and receive TPC command carried by DCI format 3B.

It will be appreciated by persons skilled in the art that the effects that could be achieved with the present disclosure are not limited to what has been particularly described hereinabove and the above and other effects that the present disclosure could achieve will be more clearly understood from the following detailed description

BRIEF DESCRIPTION OF THE DRAWINGS

A more particular description of the embodiments briefly described above will be rendered by reference to specific embodiments that are illustrated in the appended drawings. Understanding that these drawings depict only some embodiments, and are not therefore to be considered as limiting of scope, the embodiments will be described and explained with additional specificity and detail using accompanying drawings, in which:

FIGS. 1 (a) and (b) are schematic diagrams illustrating legacy SRS transmission;

DETAILED DESCRIPTION

As will be appreciated by one skilled in the art that certain aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may generally all be referred to herein as a "circuit", "module" or "system". Furthermore, embodiments may take the form of a program product embodied in one or more computer readable storage devices storing machine-readable code, computer readable code, and/or program code, referred to hereafter as "code". The storage devices may be tangible, non-transitory, and/or non-transmission. The storage devices may not embody signals. In a certain embodiment, the storage devices only employ signals for accessing code.

Certain functional units described in this specification may be labeled as "modules", in order to more particularly emphasize their independent implementation. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but, may include disparate instructions stored in different locations which, when joined logically together, include the module and achieve the stated purpose for the module.

Indeed, a module of code may contain a single instruction, or many instructions, and may even be distributed over several different code segments, among different programs, and across several memory devices. Similarly, operational data may be identified and illustrated herein within modules and may be embodied in any suitable form and organized within any suitable type of data structure. This operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing code. The storage device may be, for example, but need not necessarily be, an electronic, magnetic, optical, electromagnetic, infrared, holographic, micromechanical, or semiconductor system, apparatus, or device, or any suitable combination of the foregoing.

A non-exhaustive list of more specific examples of the storage device would include the following: an electrical connection having one or more wires, a portable computer diskette, a hard disk, random access memory (RAM), read-only memory (ROM), erasable programmable read-only memory (EPROM or Flash Memory), portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Code for carrying out operations for embodiments may include any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may be executed entirely on the user's computer, partly on the user's computer, as a stand-alone software package, partly on the user's computer and partly on a remote computer or entirely on the remote computer or server. In the very last scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment", "an embodiment", or similar language means that a particular feature, structure, or characteristic described in connection with the embodiment is included in at least one embodiment. Thus, appearances of the phrases "in one embodiment", "in an embodiment", and similar language throughout this specification may, but do not necessarily, all refer to the same embodiment, but mean "one or more but not all embodiments" unless expressly specified otherwise. The terms "including", "comprising", "having", and variations thereof mean "including but are not limited to", unless otherwise expressly specified. An enumerated listing of items does not imply that any or all of the items are mutually exclusive, otherwise unless expressly specified. The terms "a", "an", and "the" also refer to "one or more" unless otherwise expressly specified.

Furthermore, described features, structures, or characteristics of various embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid any obscuring of aspects of an embodiment.

Aspects of different embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which are executed via the processor of the computer or other programmable data processing apparatus, create means for implementing the functions specified in the schematic flowchart diagrams and/or schematic block diagrams for the block or blocks.

The code may also be stored in a storage device that can direct a computer, other programmable data processing apparatus, or other devices, to function in a particular manner, such that the instructions stored in the storage device produce an article of manufacture including instructions which implement the function specified in the schematic flowchart diagrams and/or schematic block diagrams block or blocks.

The code may also be loaded onto a computer, other programmable data processing apparatus, or other devices, to cause a series of operational steps to be performed on the computer, other programmable apparatus or other devices to produce a computer implemented process such that the code executed on the computer or other programmable apparatus provides processes for implementing the functions specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that in some alternative implementations, the functions noted in the block may occur out of the order noted in the Figures. For example, two blocks shown in succession may substantially be executed concurrently, or the blocks may sometimes be executed in the reverse order, depending upon the functionality involved. Other steps and methods may be conceived that are equivalent in function, logic, or effect to one or more blocks, or portions thereof, to the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each Figure may refer to elements of proceeding figures. Like numbers refer to like elements in all figures, including alternate embodiments of like elements.

Figure 1:
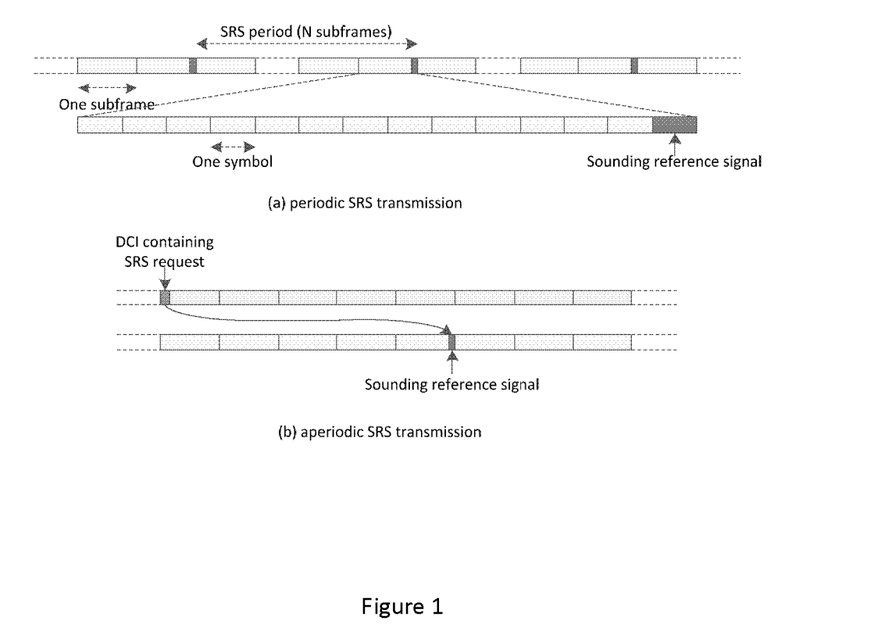

FIGS. 1 (a) and (b) are schematic diagrams illustrating legacy SRS transmission.

There are two types of SRS transmission defined in LTE Release 15, i.e. periodic SRS transmission triggered by higher layer signaling (may be referred to as trigger type 0) and aperiodic SRS transmission triggered by DCI (may be referred to as trigger type 1). As illustrated in FIG. 1(a), UE transmits SRS with a certain period, for example N subframes, which is configured by higher layer signaling (not shown in FIG. 1(a)). SRS can only be transmitted at the last symbol of a normal subframe in LTE Release 15. As illustrated in FIG. 1(b), UE transmits aperiodic SRS (shown as 'Sounding reference signal' in FIG. 1(b)) in response to a SRS request contained in a DCI (shown as 'DCI containing SRS request' in FIG. 1(b)).

Additional SRS is introduced in LTE Release 16 to enhance the SRS capacity. The additional SRS can be transmitted at any symbols other than the last symbol in the normal subframe.

Figure 2:
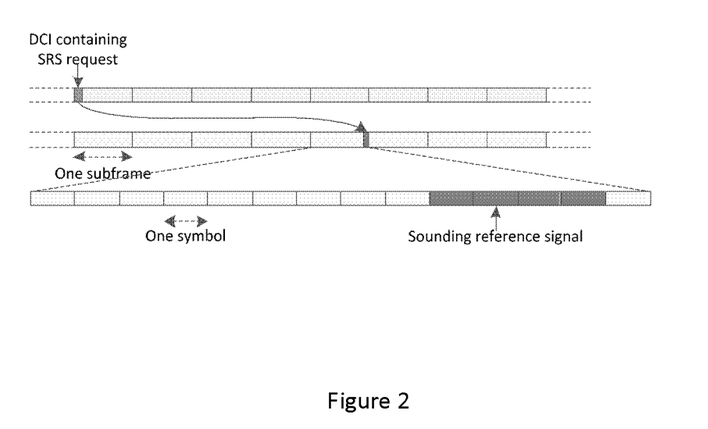
FIG. 2 is a schematic diagram illustrating additional SRS transmission.

FIG. 2 is a schematic diagram illustrating additional SRS transmission.

As illustrated in FIG. 2, UE transmits an aperiodic SRS triggered by a received DCI containing an SRS request field. The aperiodic SRS is transmitted at 10th, 11th, 12th, and 13th symbols in a normal subframe.

Incidentally, it is common knowledge that one subframe consists of 14 symbols, referred to as 0, 1, 2, 3, 4, 5, 6, 7, 8, 9, 10, 11, 12 and 13 symbols, or as 1st, 2nd, 3rd, 4th, 5th, 6th, 7th, 8th, 9th, 10th, 11th, 12th, 13th and 14th symbols. It is obvious that the 10th, the 11th, the 12th, and the 13th symbols may also be referred to as symbols 9, 10, 11 and 12.

Figure 3:
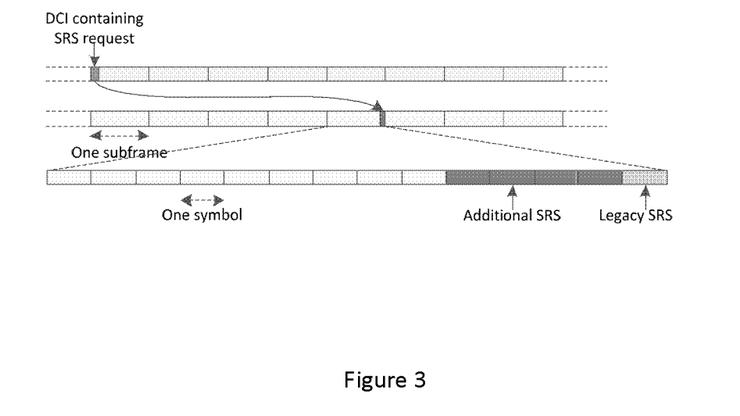
FIG. 3 is a schematic diagram illustrating the concurrent transmission of additional SRS and legacy SRS.

FIG. 3 is a schematic diagram illustrating the concurrent transmission of additional SRS and legacy SRS.

Aperiodic additional SRS and aperiodic legacy SRS can be transmitted in the same subframe. As illustrated in FIG. 3, a DCI containing SRS request field triggers the transmission of aperiodic additional SRS and aperiodic legacy SRS. The additional SRS is transmitted at the 10th, the 11th, the 12th, and the 13th symbols (i.e. symbols 9, 10, 11 and 12) in a subframe, while the legacy SRS is transmitted only at the 14th symbol (i.e. symbol 13) which is the last symbol in the same subframe.

Incidentally, in case of legacy SRS is periodic, legacy SRS and aperiodic additional SRS can be transmitted in the same or different subframes.

Figure 4:
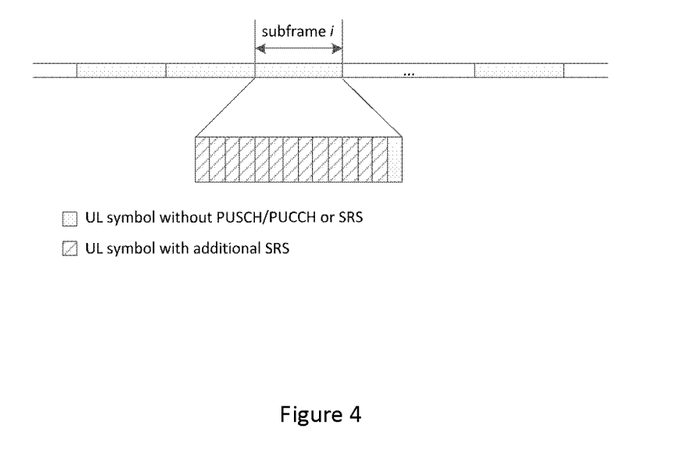
FIG. 4 illustrates a scenario in which additional SRS is transmitted in a subframe without PUSCH/PUCCH or legacy SRS.

FIG. 4 illustrates a scenario in which additional SRS is transmitted in a subframe without PUSCH/PUCCH or legacy SRS according to a first embodiment. In other words, according to the first embodiment, only additional SRS is transmitted in this subframe. As well known in the art, additional SRS may be transmitted in any of the first to the thirteenth symbols except for the last (the fourteenth) symbol within one subframe. In the example illustrated in FIG. 4, additional SRS is transmitted in subframe i by one UE with a repetition factor R=13 (i.e. in the first to the thirteenth symbols).

It is agreed that a same power control configuration applies for all additional SRS symbols configured to a single UE. Therefore, all of the additional SRS symbols (the first to the thirteenth symbols) shown in FIG. 4 will be transmitted with the same power.

The power for the additional SRS symbols $P_{additional\_SRS,c}(i)$ according to the first embodiment may be given as:

$$P_{additional\_SRS,c}(i) = \min\{P_{CMAX,c}(i), 10\log_{10}(M_{SRS,c}) + P'_{O\_SRS,c} + \alpha'_{SRS,c} \times PL_c + f'_{SRS,c}\} \text{ [dBm]} \quad \text{(Equation 1)}$$

In Equation 1, $P_{additional\_SRS,c}(i)$ is the minimum value between $P_{CMAX,c}(i)$ and $10\log_{10}(M_{SRS,c}) + P'_{O\_SRS,c} + \alpha'_{SRS,c} \times PL_c + f'_{SRS,c}$.

$P_{CMAX,c}(i)$ is the maximum transmit power configured for the UE in subframe i for serving cell c. Therefore, the maximum power used for additional SRS symbol(s) will not exceed $P_{CMAX,c}(i)$.

$10\log_{10}(M_{SRS,c})+P'_{O\_SRS,c}+\alpha'_{SRS,c}\times PL_c+f'_{SRS,c}$ is the transmit power calculated according to the bandwidth of additional SRS and the TPC command for the additional SRS.

$M_{SRS,c}$ is the bandwidth of the additional SRS transmission in subframe i for serving cell c expressed in number of RBs.

$P_{O\_SRS,c}'$ is a target receiving power configured by higher layers. In particular, $P_{O\_SRS,c}'$ may be composed of the sum of a common component $P_{O\_NORMINAL\_SRS,c}$ and a dedicated component $P_{O\_UE\_SRS,c}'$ configured by higher layers for additional SRS.

For aperiodic additional SRS, $P_{O\_NORMINAL\_SRS,c}$ is the same as $P_{O\_NORMINAL\_SRS,c}(1)$ configured by higher layer parameter p0-Nominal-AperiodicSRS-r14 for Rel-14 SRS and $P_{O\_UE\_SRS,c}'$ is dedicatedly configured for additional aperiodic SRS by higher layers, e.g. p0-UE-AperiodicSRS-r16.

For periodic additional SRS, $P_{O\_NORMINAL\_SRS,c}$ is the same as $P_{O\_NORMINAL\_SRS,c}(0)$ configured by higher layer parameter p0-Nominal-PeriodicSRS-r14 for Rel-14 SRS and $P_{O\_UE\_SRS,c}'$ is dedicatedly configured for additional periodic SRS by higher layers, e.g. p0-UE-PeriodicSRS-r16.

$\alpha_{SRS,c}'$ is the partial path-loss compensation factor configured for additional SRS by higher layers, e.g. alpha-SRS-r16.

$PL_c$ is the downlink path loss estimate calculated in the UE for serving cell c in dB. In particular, $PL_c$=referenceSignalPower–higher layer filtered RSRP, where referenceSignalPower is provided by higher layers, RSRP is a reference signal receive power defined for the reference serving cell and the higher layer filter coefficient is configured by higher layers.

In the condition of serving cell c with frame structure type 1 or 2 defined in the 3GPP specification TS 36.211, and additional SRS being transmitted in a subframe without PUSCH/PUCCH or legacy SRS, the current SRS power control adjustment state is given by $f_{SRS,c}'(i)$ and is defined by $f_{SRS,c}'(i)=f_{SRS,c}'(i-1)+\delta_{SRS,c}(i-K_{SRS})$ if power accumulation is enabled and $f_{SRS,c}'(i)=\delta_{SRS,c}(i-K_{SRS})$ if power accumulation is not enabled.

$\delta_{SRS,c}(i-K_{SRS})$ is a correction value, also referred to as a SRS TPC command signalled on PDCCH with DCI format 3B in the most recent subframe $i-K_{SRS}$ where $K_{SRS}$ is an integer and $K_{SRS}\geq 4$.

$\delta_{SRS}$ is determined according to TPC command contained in DCI format 3B that is used for transmission of a group of TPC commands for SRS transmissions by one or more UEs. In the condition that no TPC command is decoded from DCI format 3B for a subframe for serving cell c, $\delta_{SRS,c}=0$. If higher layer parameterfieldTypeFormat3B indicates 2-bit TPC command, the $\delta_{SRS}$ dB value is obtained by referring to below Table 1. If higher layer parameterfieldTypeFormat3B indicates 1-bit TPC command, the $\delta_{SRS}$ dB value is obtained by referring to below Table.

TABLE 1

Mapping of TPC Command Field in DCI format 3B to absolute and accumulated $\delta_{SRS}$ values for 2-bit TPC command

| TPC Command Field in DCI format 3B | Accumulated $\delta_{SRS}$ [dB] | Absolute $\delta_{SRS}$ [dB] |
|---|---|---|
| 0 | −1 | −4 |
| 1 | 0 | −1 |
| 2 | 1 | 1 |
| 3 | 3 | 4 |

TABLE 2

Mapping of TPC Command Field in DCI format 3B to accumulated $\delta_{SRS}$ values for 1-bit TPC command

| TPC Command Field in DCI format 3B | Accumulated $\delta_{SRS}$ [dB] |
|---|---|
| 0 | −1 |
| 1 | 0 |

DCI format 3B may be used to transmit the TPC command for additional SRS. In one embodiment, additional dedicated scrambling ID, e.g. srs-TPC-RNTI-r16, is introduced to identify the dedicated TPC command for additional SRS. The same $\delta_{SRS}$ as Rel-15 can be used by means of DCI format 3B. In another embodiment, additional fields in DCI format 3B are introduced to transmit the TPC command for additional SRS. An additional parameter startingBitOfFormat3BForAdditionSRS may be configured by higher layers to indicate the UE to obtain the TPC command for additional SRS.

In one embodiment, The following higher layer parameters may be firstly configured for independent power control for additional SRS only transmission.

| UplinkPowerControl information elements | | | |
|---|---|---|---|
| UplinkPowerControlCommonPUSCH-LessCell-v16::=<br>  alpha-SRS-r16<br>} | SEQUENCE {<br>Alpha-rl6 | OPTIONAL | -- Need OR |
| UplinkPUSCH-LessPowerControlDedicated-v16 ::=<br>  p0-UE-PeriodicSRS-r16<br>  p0-UE-AperiodicSRS-r16<br>  accumulationEnabled-r16<br>} | SEQUENCE {<br>INTEGER (−8 . . 7)<br>INTEGER (−8 . . 7)<br>BOOLEAN | OPTIONAL,<br><br>OPTIONAL, | -- Need OR<br>-- Need OR |

The following higher layer parameters may be added in the SRS-TPC-PDCCH-Config information element to enable the TPC command for additional SRS used by DCI format 3B.

| SRS-TPC-PDCCH-Config information element |
|---|

```
SRS-TPC-PDCCH-Config-r16 ::=      CHOICE {
    release                         NULL,
    setup                           SEQUENCE {
        srs-TPC-RNTI-r16                              BIT STRING (SIZE (16)),
        startingBitOfFormat3BForAdditionalSRS-r16     INTEGER (0 . . 31),
        fieldTypeFormat3B-r16                         INTEGER (1 . . 4),
        srs-CC-SetIndexlist-r16                       SEQUENCE (SIZE(1 . . 4)) OF SRS-
                                                      CC-
SetIndex-r16  OPTIONAL   -- Cond SRS-Trigger-TypeA
}
```

As indicated in Equation 1, various parameters are discussed. Among these parameters, $10 \log_{10}(M_{SRS,c})$, $P'_{O\_SRS,c}$ and $\alpha'_{SRS,c} \times PL_c$ are open loop power control parameters. These parameters are transmitted to the UE by higher layers. On the other hand, $f_{SRS,c}(i)$ is a close loop power control parameter. It is transmitted to the UE by means of TPC command carried by DCI format 3B. $f_{SRS,c}(i)$ is an adjustment to the open loop power (i.e. $10 \log_{10}(M_{SRS,c}) + P'_{O\_SRS,c}(m) + \alpha'_{SRS,c} \times PL_c$). $f_{SRS,c}(i)$ is determined on the basis of TPC command contained in DCI format 3B, and may be different each time DCI format 3B is transmitted to the UE.

When only additional SRS is transmitted in a subframe, a Type 3 power headroom report is computed according to:

$$PH_{type3,c}(i) = P_{CMAX,c}(i) - \{10 \log_{10}(M_{SRS,c}) + P'_{O\_SRS,c}(m) + \alpha'_{SRS,c} \times PL_c + f'_{SRS,c}(i)\}$$

Figure 5:
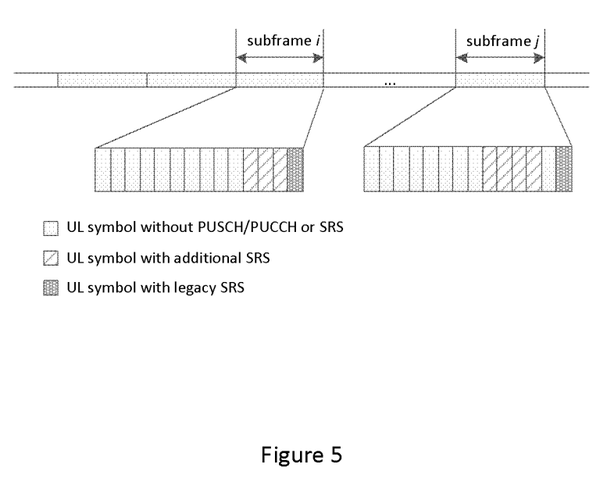
FIG. 5 illustrates a scenario in which additional SRS and legacy SRS are transmitted in a subframe without PUSCH/PUCCH.

FIG. 5 illustrates a scenario in which additional SRS and legacy SRS are transmitted in a subframe without PUSCH/PUCCH.

According to a second embodiment, as shown with subframe i in FIG. 5, additional SRS and legacy SRS are transmitted continuously. That is, additional SRS is transmitted in the eleventh, twelfth and thirteenth symbols and legacy SRS is transmitted in the fourteenth (i.e. the last) symbol. No guard period is present between the additional SRS and the legacy SRS. In this condition, the additional SRS and the legacy SRS would be transmitted with the same bandwidth. The UE may choose to transmit the additional SRS and the legacy SRS with the same transmit power.

According to the second embodiment, the TPC command configured by DCI format 3B for additional SRS may be applied for both additional SRS and legacy SRS. The transmit power according to the second embodiment may be given as:

$$P_{SRS,c} = \min\{P_{CMAX,c}(i), 10 \log_{10}(M_{SRS,c}) + P'_{O\_SRS,c} + \alpha'_{SRS,c} \times PL_c + f'_{SRS,c}\} \text{ [dBm]} \quad \text{(Equation 2)}$$

Each item in the Equation 2 is similar to that in the Equation 1. The only difference is that, when higher layers configure open loop parameters, the additional SRS and legacy SRS are considered in combination. For example, as the additional SRS and the legacy SRS are transmitted with the same bandwidth, the bandwidth of the additional SRS and legacy SRS transmissions is the same as the bandwidth of the additional SRS transmission. The TPC command applies for both additional SRS and legacy SRS.

According to a variety of the second embodiment, the TPC commands configured by DCI format 3B may be only applied for additional SRS. The transmit power may be given as:

$$P_{SRS,c}(i) = \min\{P_{CMAX,c}(i), P_{Additional\_SRS,c}(i), P_{Legacy\_SRS,c}(i)\} \text{ [dBm]} \quad \text{(Equation 3)}$$

In the Equation 3, $P_{CMAX,c}(i)$ is the maximum transmit power configured for the UE in subframe i for serving cell c, i.e. the same as that described for Equation 1.

$P_{Additional\_SRS,c}(i)$ may be given the same as Equation 1. $P_{Legacy\_SRS,c}(i)$ may be given as:

$$P_{SRS\_OFFSET,c}(m) + 10 \log_{10}(M_{SRS,c}) + P_{O\_PUSCH,c}(j) + \alpha_c(j) \cdot PL_c + f_c(i) \text{[dBm]} \quad \text{(Equation 4)}$$

$P_{SRS\_OFFSET,c}(m)$ is the power offset between PUSCH and legacy SRS. $M_{SRS,c}$ is the bandwidth of legacy SRS. $P_{O\_PUSCH,c}(j)$ is a parameter composed of the sum of a component $P_{O\_NOMINAL\_USCH,c}(j)$ and $P_{O\_PUSCH,c}(j)$, which are configured by higher layers. $\alpha_c(j)$ is the partial path-loss compensation factor configured for PUSCH, $PL_c$ is the same as that in Equation 1. $f_c(i)$ is the close loop power control component determined by TPC command for PUSCH.

According to a third embodiment, as shown with subframe j in FIG. 5, additional SRS and legacy SRS are transmitted with a one symbol guard period therebetween. This is useful especially in the condition that additional SRS and legacy SRS are transmitted in one normal subframe with different bandwidths or occupy different subcarrier sets. When a one symbol guard period is configured between the additional SRS and legacy SRS, the UE may transmit the additional SRS and legacy SRS using different powers.

According to the third embodiment, the transmit power for additional SRS is given the same as Equation 1.

The transmit power for legacy SRS is given the same as Equation 4.

For example, aperiodic additional SRS and periodic SRS are transmitted in subframe j illustrated in FIG. 5. The legacy SRS may be configured with wideband triggered by higher layers and the additional SRS may be configured with subband triggered by DCI. A one symbol guard period is configured between legacy SRS and additional SRS. In this condition, the UE may transmit the additional SRS with the power $P_{Additional\_SRS,c}(i)$ and transmit the legacy SRS with the power $P_{Legacy\_SRS,c}(i)$. In this condition, the TPC command transmitted by DCI format 3B only applies for additional SRS.

Figure 6:
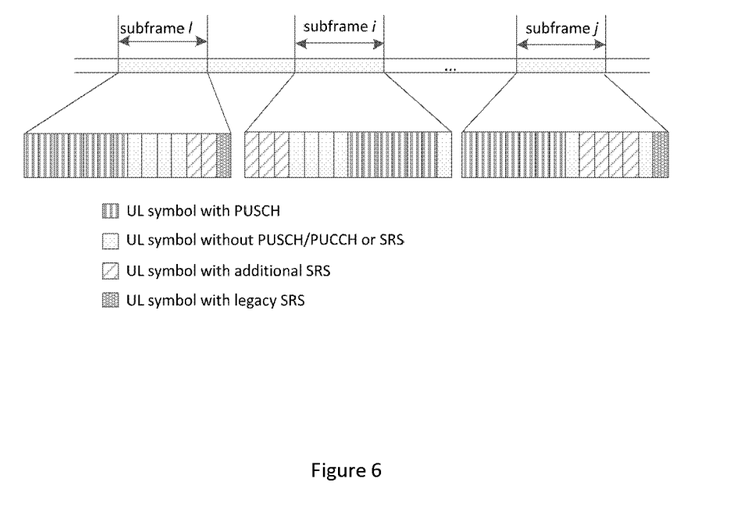
FIG. 6 illustrates a scenario in which additional SRS and PUSCH/PUCCH are transmitted in a subframe with or without legacy SRS.

FIG. 6 illustrates a scenario in which additional SRS and PUSCH/PUCCH are transmitted in a subframe with or without legacy SRS.

Short TTI based short PUSCH (sPUSCH) with 6 or 7 symbols duration transmission is supported in Rel-15 LTE. As shown in FIG. 6, sPUSCH (shown as PUSCH in FIG. 6) can be transmitted with additional and/or legacy SRS within the same slot. In order to limit the number of power changes between different channels, the UE can determine the transmit power for additional and/or legacy SRS according to the following different embodiments.

According to a fourth embodiment, as shown with subframe 1 in FIG. 6, additional SRS and legacy SRS are transmitted within the same bandwidth or occupy the same subcarrier set, in addition that PUSCH is transmitted in the same subframe l. According to the fourth embodiment, the UE can transmit additional SRS and legacy SRS with the same power determined by $$P_{SRS,c} = \min\{P_{CMAX,c}(i), P_{SRS\_OFFSET,c}' + 10 \log_{10}(M_{SRS,c}) + P_{O\_PUSCH,c}(j) + \alpha_{PUSCH,c}(j) \times PL_c + f_c(i)\} \text{ [dBm]}$$ (Equation 5) or $$P_{SRS,c}(i) = \min\{P_{CMAX,c}(i), P_{Additional\_SRS,c}(i), P_{Legacy\_SRS,c}(i)\} \text{ [dBm]}$$ (Equation 6)

In Equation 5, $P_{SRS\_OFFSET,c}'$ is a power offset configured by higher layers. $P_{SRS\_OFFSET,c}'$ is the power offset between PUSCH and additional SRS. $M_{SRS,c}$ is the bandwidth of the additional SRS. $P_{O\_PUSCH,c}(j)$, $\alpha_{PUSCH,c}(j)$ and $PL_c$ are open loop power parameters configured by higher layers for PUSCH. $f_c(i)$ is close loop power parameter according to the TPC command for PUSCH.

Equation 6 is the same as Equation 3. That is, the UE takes the minimum power among the maximum transmit power, the transmit power calculated according to the additional SRS and the transmit power calculated according to the legacy SRS, as the transmit power to transmit both the additional SRS and the legacy SRS.

According to a fifth embodiment, as shown with subframe i illustrated in FIG. 6, additional SRS and PUSCH are transmitted in the same subframe without legacy SRS. According to the fifth embodiment, the UE can transmit additional SRS with the power given as $$P_{SRS,c} = \min\{P_{CMAX,c}(i), P_{SRS\_OFFSET,c}' + 10 \log_{10}(M_{SRS,c}) + P_{O\_PUSCH,c}(j) + \alpha_{PUSCH,c}(j) \times PL_c + f_c(i)\} \text{ [dBm]}$$ (Equation 7)

Equation 7 is the same as Equation 5.

According to a sixth embodiment, as shown with subframe j illustrated in FIG. 6, PUSCH, aperiodic additional SRS and periodic SRS may be transmitted in the subframe j with different bandwidths. A one symbol guard period may be configured between additional SRS and legacy SRS. Additionally, a one symbol guard period may be configured between PUSCH and additional SRS. The UE may transmit the additional SRS and legacy SRS with different powers, which may be given the same as the third embodiment.

Figure 7:
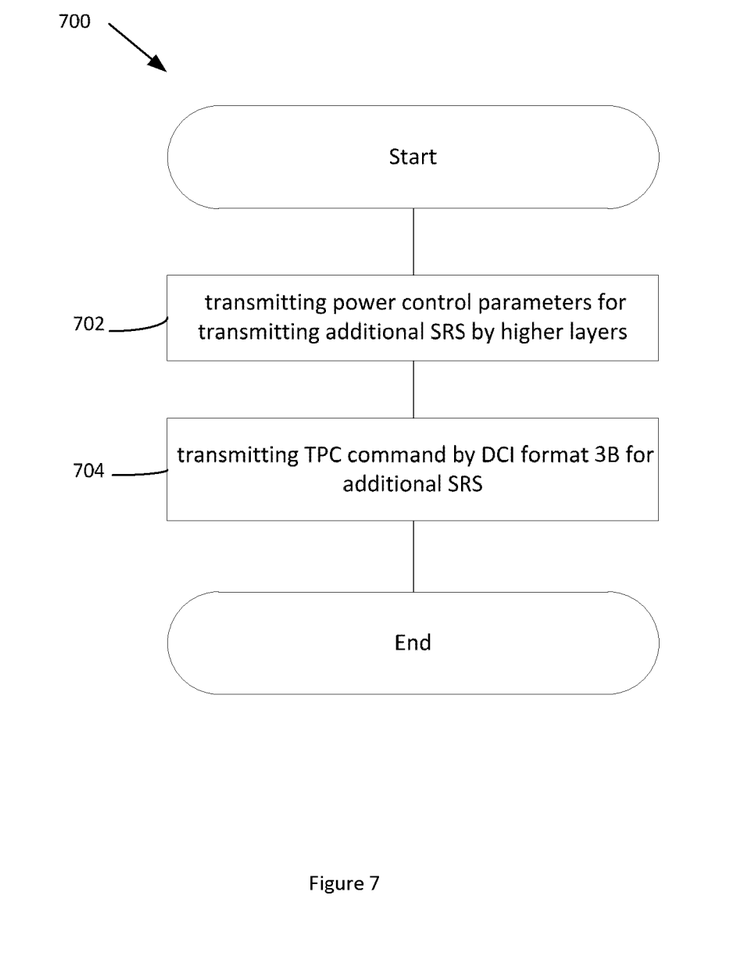
FIG. 7 is a schematic flow chart diagram illustrating an embodiment of a method for power control of additional SRS.

FIG. 7 is a schematic flow chart diagram illustrating an embodiment of a method 700 for power control of additional SRS. In some embodiments, the method 700 is performed by an apparatus, such as a base unit. In certain embodiments, the method 700 may be performed by a processor executing program code, for example, a microcontroller, a microprocessor, a CPU, a GPU, an auxiliary processing unit, a FPGA, or the like.

The method 700 may include 702 transmitting power control parameters for transmitting additional SRS by higher layers. For example, in the first to the sixth embodiments, the power control parameters may include, for additional SRS and/or legacy SRS and/or PUSCH, the bandwidth, the target receiving power, the partial path-loss compensation factor and the downlink path loss estimate. The method 700 may further include 704 transmitting TPC command by DCI format 3B for additional SRS. The SRS power control adjustment state can be derived from the TPC command.

Figure 8:
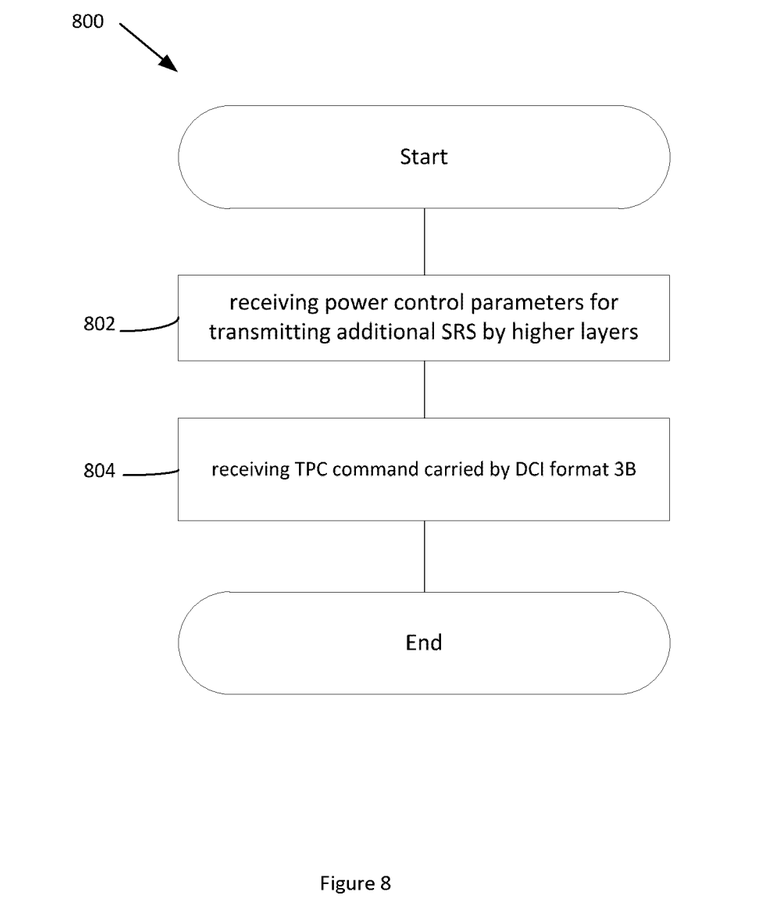
FIG. 8 is a schematic flow chart diagram illustrating a further embodiment of a method for power control of additional SRS.

FIG. 8 is a schematic flow chart diagram illustrating a further embodiment of a method 800 for power control of additional SRS. In some embodiments, the method 800 is performed by an apparatus, such as a remote unit. In certain embodiments, the method 800 may be performed by a processor executing program code, for example, a microcontroller, a microprocessor, a CPU, a GPU, an auxiliary processing unit, a FPGA, or the like.

The method 800 may include 802 receiving power control parameters for transmitting additional SRS by higher layers and 804 receiving TPC command carried by DCI format 3B.

Figure 9:
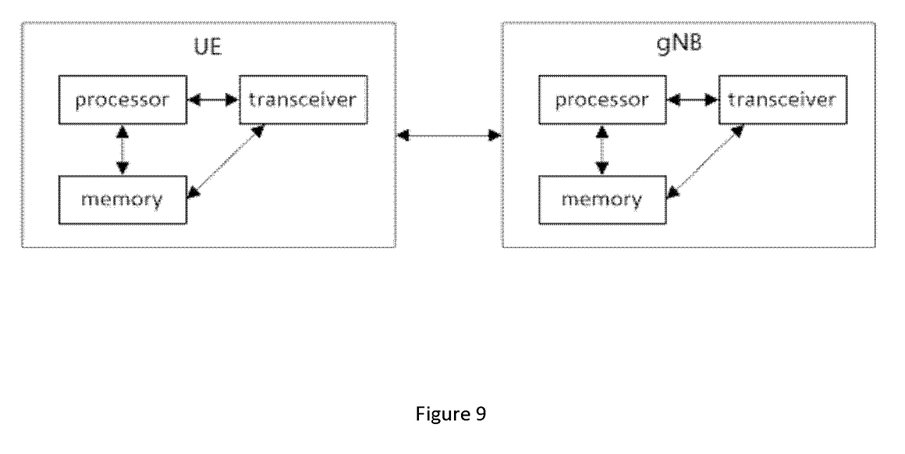
FIG. 9 is a schematic block diagram illustrating apparatuses according to one embodiment.

FIG. 9 is a schematic block diagram illustrating apparatuses according to one embodiment.

Referring to FIG. 9, the UE (i.e. remote unit) includes a processor, a memory, and a transceiver. The processor implements a function, a process, and/or a method which are proposed in FIG. 8. The gNB (i.e. base unit) includes a processor, a memory, and a transceiver. The processors implement a function, a process, and/or a method which are proposed in FIG. 7. Layers of a radio interface protocol may be implemented by the processors. The memories are connected with the processors to store various pieces of information for driving the processors. The transceivers are connected with the processors to transmit and/or receive a radio signal. Needless to say, the transceiver may be implemented as a transmitter to transmit the radio signal and a receiver to receive the radio signal.

The memories may be positioned inside or outside the processors and connected with the processors by various well-known means.

In the embodiments described above, the components and the features of the embodiments are combined in a predetermined form. Each component or feature should be considered as an option unless otherwise expressly stated. Each component or feature may be implemented not to be associated with other components or features. Further, the embodiment may be configured by associating some components and/or features. The order of the operations described in the embodiments may be changed. Some components or features of any embodiment may be included in another embodiment or replaced with the component and the feature corresponding to another embodiment. It is apparent that the claims that are not expressly cited in the claims are combined to form an embodiment or be included in a new claim.

The embodiments may be implemented by hardware, firmware, software, or combinations thereof. In the case of implementation by hardware, according to hardware implementation, the exemplary embodiment described herein may be implemented by using one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and the like.

Embodiments may be practiced in other specific forms. The described embodiments are to be considered in all respects to be only illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method at a user equipment (UE), the method comprising:
   receiving power control parameters for transmitting additional sounding reference signal (SRS) by higher layers;
   receiving a transmit power control (TPC) command by a downlink control information (DCI) format 3B; and
   determining transmit power for additional SRS according to $P_{SRS,c}(i) = P_{additional\_SRS,c}$ when the additional SRS is transmitted in a normal subframe without a physical uplink shared channel (PUSCH), a physical uplink control channel (PUCCH), or a legacy SRS.

2. The method of claim 1, wherein the DCI format 3B is scrambled by a dedicated scrambling identifier (ID) configured by higher layers.

3. The method of claim 1, further comprising: determining the same transmit power for the additional SRS and legacy SRS according to $P_{SRS,c}(i)=\min\{P_{additional\_SRS,c}(i), P_{Legacy\_SRS,c}(i)\}$ when the additional SRS and the legacy SRS are transmitted in the same subframe.

4. The method of claim 1, further comprising: determining transmit power for additional SRS according to $P_{SRS,c}(1)=P_{additional\_SRS,c}(i)$ when the additional SRS and legacy SRS are transmitted in the same subframe and a one symbol guard period is configured between the additional SRS and the legacy SRS.

5. The method of claim 1, wherein $$P_{additional\_SRS,c}(i)=\min\{P_{CMAX,c}(i), 10 \log_{10}(M_{SRS,c})+P'_{O\_SRS,c}+\alpha'_{SRS,c}\times PL_c+f'_{SRS,c}\}$$

wherein, $P_{CMAX,c}(i)$ is maximum transmit power configured for the remote unit in subframe i for serving cell c, $M_{SRS,c}$ is the bandwidth of the additional SRS in subframe i for serving cell c expressed in number of RBs, $P'_{O\_SRS,c}$ is a target receiving power configured by higher layers, $\alpha'_{SRS,c}$ is the partial path-loss compensation factor configured for additional SRS by higher layers, PLc is the downlink path loss estimate calculated in the remote unit for serving cell c, and $f_{SRS,c}(i)$ is SRS power control adjustment state determined according to the TPC command for additional SRS.

6. The method of claim 1, further comprising: determining type 3 power headroom report according to $$PH_{type3,c}(i)=P_{CMAX,c}(i)-\{10 \log_{10}(M_{SRS,c})+P'_{O\_SRS,c}(m)+\alpha'_{SRS,c}\times PL_c+f'_{SRS,c}(i)\},$$

wherein, $P_{CMAX,c}(i)$ is maximum transmit power configured for the remote unit in subframe i for serving cell c, $M_{SRS,c}$ is the bandwidth of the additional SRS in subframe i for serving cell c expressed in number of RBs, $P'_{O\_SRS,c}$ is a target receiving power configured by higher layers, $\alpha'_{SRS,c}$ is the partial path-loss compensation factor configured for additional SRS by higher layers, PLc is the downlink path loss estimate calculated in the remote unit for serving cell c, and $f'_{SRS,c}(i)$ is SRS power control adjustment state determined according to the TPC command for additional SRS.

7. A base station, comprising
at least one memory; and
at least one processor coupled with the at least one memory and configured to cause the base station to:
transmit power control parameters for transmitting additional SRS by higher layers; and
transmit TPC command by DCI format 3B for additional SRS, wherein additional field is added to DCI format 3B for the TPC command for additional SRS, and the start bit of the additional field is configured by higher layers.

8. The base station unit of claim 7, wherein the DCI format 3B is scrambled by a dedicated scrambling ID configured by higher layers.

9. A user equipment (UE), comprising
at least one memory; and
at least one processor coupled with the at least one memory and configured to cause the UE to:

receive power control parameters for transmitting additional SRS by higher layers;
receive TPC command carried by DCI format 3B; and
determine transmit power for additional SRS according to $P_{SRS,c}(i)=P_{additional\_SRS,c}(i)$ when the additional SRS is transmitted in a normal subframe without a physical uplink shared channel (PUSCH), a physical uplink control channel (PUCCH), or a legacy SRS.

10. The UE of claim 9, wherein the DCI format 3B is scrambled by a dedicated scrambling ID configured by higher layers.

11. The UE of claim 10, wherein additional field is added to DCI format 3B for the TPC command for additional SRS, and the start bit of the additional field is configured by higher layers.

12. The UE of claim 10, wherein the at least one processor is configured to cause the UE to determine the same transmit power for the additional SRS and legacy SRS according to $P_{SRS,c}(i)=P_{additional\_SRS,c}(i)$ when the additional SRS and the legacy SRS are transmitted in the same subframe without PUSCH/PUCCH.

13. The UE of claim 10, wherein the at least one processor is configured to cause the UE to determine the same transmit power for the additional SRS and legacy SRS according to $P_{SRS,c}(i)=\min\{P_{additional\_SRS,c}(i), P_{Legacy\_SRS,c}(i)\}$ when the additional SRS and the legacy SRS are transmitted in the same subframe.

14. The UE of claim 10, wherein the at least one processor is configured to cause the UE to determine transmit power for additional SRS according to $P_{SRS,c}(i)=P_{additional\_SRS,c}(i)$ when the additional SRS and legacy SRS are transmitted in the same subframe and a one symbol guard period is configured between the additional SRS and the legacy SRS.

15. The UE of claim 10, wherein the power control parameters include power offset $P'_{SRS\_OFFSET,c}$ between PUSCH and the additional SRS, and wherein the at least one processor is configured to cause the UE to determine transmit power for additional SRS according to $$P_{SRS,c}=\min\{P_{CMAX,c}(i), P'_{SRS\_OFFSET,c}+10 \log_{10}(M_{SRS,c})+P_{O\_PUSCH,c}(j)+\alpha_{PUSCH,c}(j)\times PL_c+f_c(i)\}$$

wherein, $P_{CMAX,c}(i)$ is maximum transmit power configured for the remote unit in subframe i for serving cell c, $M_{SRS,c}$ is the bandwidth of the additional SRS, $P_{O\_PUSCH,c}(j)$, $\alpha_{PUSCH,c}(j)$ and $PL_c$ are open loop power parameters configured by higher layers for PUSCH, and $f_c(i)$ is close loop power parameter according to the TPC command for PUSCH.

16. The UE remote unit of claim 12, wherein $$P_{additional\_SRS,c}(i)=\min\{P_{CMAX,c}(i), 10 \log_{10}(M_{SRS,c})+P'_{O\_SRS,c}+\alpha'_{SRS,c}\times PL_c+f'_{SRS,c}\}$$

wherein, $P_{CMAX,c}(i)$ is maximum transmit power configured for the remote unit in subframe i for serving cell c, $M_{SRS,c}$ is the bandwidth of the additional SRS in subframe i for serving cell c expressed in number of RBs, $P_{O\_SRS,c}$ is a target receiving power configured by higher layers, $\alpha'_{SRS,c}$ is the partial path-loss compensation factor configured for additional SRS by higher layers, PLc is the downlink path loss estimate calculated in the remote unit for serving cell c, and $f'_{SRS,c}(i)$ is SRS power control adjustment state determined according to the TPC command for additional SRS.

17. The UE of claim 12, wherein the at least one processor is configured to cause the UE to determine type 3 power headroom report according to $$PH_{type3,c}(i) = P_{CMAX,c}(i) - \{10 \log_{10}(M_{SRS,c}) + P'_{O\_SRS,c}(m) + \alpha'_{SRS,c} \times PL_c + f'_{SRS,c}(i)\},$$

wherein, $P_{CMAX,c}(i)$ is maximum transmit power configured for the remote unit in subframe i for serving cell c, $M_{SRS,c}$ is the bandwidth of the additional SRS in subframe i for serving cell c expressed in number of RBs, $P'_{O\_SRS,c}$ is a target receiving power configured by higher layers, $\alpha'_{SRS,c}$ is the partial path-loss compensation factor configured for additional SRS by higher layers, PLc is the downlink path loss estimate calculated in the remote unit for serving cell c, and $f''_{SRS,c}(i)$ is SRS power control adjustment state determined according to the TPC command for additional SRS.

18. The method of claim 1, wherein the power control parameters include power offset $P'_{SRS\_OFFSET,c}$ between PUSCH and the additional SRS, and the method further comprising: determining transmit power for additional SRS according to $$P_{SRS,c} = \min\{P_{CMAX,c}(i), P'_{SRSOFFSET,c} + 10 \log_{10}(M_{SRS,c}) + \alpha_{PUSCH,c}(j) \times PL_c + f_c(i)\} P_{CMAX,c}(i)$$

is a maximum power configured for the remote unit in subframe i for serving cell c, $P_{OPUSCH,c}(J)$, $\alpha_{PUSCH,c}(j)$ and $PL_c$ are open loop power parameters configured by higher layers for PUSCH, and $f_c(i)$ is close loop power parameter according to the TPC command for PUSCH.

* * * * *